United States Patent [19]

DeBruler

[11] Patent Number: 4,539,637
[45] Date of Patent: Sep. 3, 1985

[54] METHOD AND APPARATUS FOR HANDLING INTERPROCESSOR CALLS IN A MULTIPROCESSOR SYSTEM

[75] Inventor: Dennis L. DeBruler, Downers Grove, Ill.

[73] Assignee: AT&T Bell Laboratories, Murray Hill, N.J.

[21] Appl. No.: 411,899

[22] Filed: Aug. 26, 1982

[51] Int. Cl.³ .............................................. G06F 15/16
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,408,628 | 10/1968 | Brass et al. | 340/172.5 |
| 3,643,227 | 2/1972 | Smith et al. | 364/200 |
| 3,761,881 | 9/1973 | Anderson et al. | 364/200 |
| 3,786,427 | 1/1974 | Schmidt et al. | 364/200 |
| 3,902,164 | 8/1975 | Kelley et al. | 364/200 |
| 4,042,912 | 8/1977 | Bachman et al. | 364/200 |
| 4,096,568 | 6/1978 | Bennett et al. | 364/200 |
| 4,145,738 | 3/1979 | Inoue et al. | 364/200 |
| 4,170,039 | 10/1979 | Beacom et al. | 364/200 |
| 4,228,496 | 10/1980 | Katzman et al. | 364/200 |
| 4,333,144 | 6/1982 | Whiteside et al. | 364/200 |
| 4,338,663 | 6/1982 | Strecker et al. | 364/200 |
| 4,404,628 | 9/1983 | Angelo | 364/200 |
| 4,412,286 | 10/1983 | O'Dowd et al. | 364/200 |
| 4,414,624 | 11/1983 | Summer, Jr. et al. | 364/200 |

FOREIGN PATENT DOCUMENTS 1170587  11/1969  United Kingdom ................ 364/200

OTHER PUBLICATIONS

A. H. Doblmaier and S. M. Neville, "The No. 1 ESS Signal Processor", *Bell Laboratories Record*, Jan. 1969, pp. 120-124.

J. C. Ewin and P. K. Giloth, "System Organization and Objectives", *The Bell System Technical Journal*, vol. 49, Dec. 1970, No. 10, pp. 2733-2752.

R. N. Ibbett et al., "The MU5 Name Store", The Computer Journal, v. 20, No. 3, pp. 227-231, Aug. 1977.

M. Satyanarayanan et al., "Design Trade-Offs in VAX-11 Translation Buffer Organization, Computer (IEEE Computer Society), v. 14, No. 12, pp. 103-111, Dec. 1981.

R. J. Swan et al., "CM*-A Modular Multi-Microprocessor", AFIPS Conference Proceedings, National Computer Conference, V. 46, pp. 637-644, Jun. 1977.

A. K. Jones, et al., Experience Using Multiprocessor Systems-A Status Report", Computing Surveys, V. 12, No. 2, Jun. 1980.

E. I. Organick, Computer System Organization, (New York, Academic Press, 1973), pp. 9-62.

S. E. Madnick, Operating Systems, (New York, McGraw-Hill Book Company, 1974), pp. 105-208.

Denelcor, Inc., *Heterogeneous Element Processor Principles of Operation*, Publication 9000001, pp. 1-1 to 4-16, Feb. 1981.

D. S. Lake et al., "Loosely Coupled Multiprocess Model Applied to a Line Switching Architecture", *IBM Technical Disclosure Bulletin*, vol. 22, No. 5, Oct. 1979, pp. 1918-1923.

R. C. Lorie et al., "Multiprocessor System for Executing Concurrent Sequential Processes with Shared Variables", *IBM Technical Disclosure Bulletin*, vol. 24, No. 2, Jul. 1981, pp. 1019-1020.

Richard J. Swan et al., "The Implementation of the CM* Multi-Microprocessor", *A.F.I.P.S. Joint Computer Conference Proceeding*, vol. 46, 1977, pp. 645-655.

*Primary Examiner*—Raulfe B. Zache
*Attorney, Agent, or Firm*—Peter Visserman

[57] ABSTRACT

A multiprocessor arrangement in which the individual program functions of a program process are executed on different processors. Data shared by different program functions is stored in shared memory and the programs are stored in local memory of the individual processors. One processor calls for the execution of a program function by another processor by causing the program address and a pointer to the program function context to be loaded into a work queue of the called processor. Input/output modules are treated as processors. Facilities are provided for the transfer of blocks of data over the interconnection bus system. Virtual address are translated to physical addresses in one facility common to all processors.

44 Claims, 6 Drawing Figures

4,539,637

METHOD AND APPARATUS FOR HANDLING INTERPROCESSOR CALLS IN A MULTIPROCESSOR SYSTEM

TECHNICAL FIELD

This invention relates to multiprocessor systems and more specifically, to means for transferring data and program control in such systems.

BACKGROUND OF THE INVENTION

A multiprocessor system is a data processing system in which a number of processors cooperate to execute the total overall task of the system. It is used when one processor cannot handle the full data processing load demanded of the system. While a great deal of progress has been made in solving the problems of multiprocessor systems having a small number of processors, no satisfactory arrangement exists for the achievement of a very high throughput in a system having a large number of modest performance processors.

Multiprocessor systems, in common with other data processing systems, use random access storage such as semiconductor random access memories, and bulk storage, such as magnetic disks or tapes. When a particular task is being performed by the system, the program and data associated with this task is stored in random access memory so that the data can be processed. At other times, the data is stored in bulk storage, ready to be transferred or paged into random access storage when the need arises.

No really satisfactory technique exists in prior art systems for efficiently and economically sharing random access memory, especially that containing programs, among many processors. Some prior art systems share all random access memory, including programs and data, among all processors. When program memory is to be fully shared among all processors, a bottleneck exists in accessing and communicating program instructions from common memory to each of the processors upon demand. Either an extremely high throughput bus or a complex bus interconnection scheme is used to transmit the instructions from the memory to several processors. Such prior art buses are expensive and the systems are limited to a small number of processors since they require the sending of vast quantities of program instructions over the buses with an inevitable loss of performance capability.

In other prior art systems, local random access memory is provided for each processor. Multiprocessor systems generally operate in the multiprocessing mode, wherein the system executes a number of broad tasks, called program processes, simultaneously. Associated with each program process are a number of variables and parameters, stored in an area of memory called the program function context. Each of these program processes accomplishes its objectives by executing a number of sub-tasks or program functions which utilize the data of the associated program function context. In prior art multiprocessing systems, a program process is usually confined to a single procesor. Placing an entire program process on one processor requires an expensive, large local memory for that processor and degrades performance by requiring a great deal of manipulation of memory contents. The alternative of breaking large processes down into small processes is also inefficient and leads to an unwieldy software structure.

Prior art multiprocessor systems use restricted and specialized communication means between processors and input/output controllers and among input/output controllers in order to avoid overloading the common system bus. Input/output controllers are associated with various combinations of devices such as magnetic disk or tape memories, input/output terminals and displays, high speed printers, punched card readers and punchers. Usually, these controllers are interconnected by arrangements with limited access; all processors cannot directly access all input/output units without considerable expense. This means that system performance is degraded if large amounts of data must be exchanged between two input/output controllers which were initially designed to exchange very little data.

Many modern processors and multiprocessor systems use a highly flexible method of addressing memory called virtual addressing. A virtual address is an address of main (random access) memory in a simulated processor system; the virtual address is translated into a physical address in the actual processor system before it is used to access random access memory. The translation mechanism is flexible so that at different times, a given virtual address may correspond to different physical addresses of random access memory; a virtual address may also correspond to an address of bulk storage. Virtual addresses tend to be fixed in a program; physical addresses are assigned to a given segment of virtual addresses when needed. A page fault occurs when a virtual address does not correspond to a physical address of random access memory, i.e., when the translation mechanism fails to find such a correspondence. Page faults always require the adjustment of the translation mechanism, and sometimes, the paging of data from bulk storage into newly assigned random access memory space.

The design of economical address translation mechanisms for translating virtual addresses to physical addresses presents a problem in a multiprocessor system. In prior art multiprocessor systems, these mechanisms are implemented using very fast circuits because the delay of address translation is added to each access of random access memory. The size of address translation mechanisms is usually restricted by cost because of the high speed requirement. A result is that many page faults, i.e., system indications that a desired memory location cannot be accessed, occur because, although the required segment is available in storage, the translation to reach that location is not currently in the address translation mechanism. In prior art multiprocessor systems with many individual processors and address translator mechanisms, address translation is expensive and tends to limit system performance. Furthermore, prior art bus schemes interconnecting the processors and shared memories of a multiprocessing system are frequently a limitation on the total throughput.

SUMMARY OF THE INVENTION

In accordance with this invention, each processor of a multiprocessor system is adapted to cause a program function to be executed by any processor of the system, by linking a request for such execution to a work queue of the called processor. The calling processor links the program function context, specifying the called program function, to the work queue of the called processor. The called processor then executes that program function. In one embodiment of this invention, the link to the program function context is augmented by a link to a program address of the called program function; the latter link need not be provided by the program function context in this case. Alternatively, the link can be part of the data provided by the program function context.

In one embodiment of this invention, each processor has local memory directly accessible only to the central processing unit of that processor used for storing programs to be executed by the associated processor. Preferrably, shared memory means also exist, accessible to all processors, and used to link the called program function context to the work queue of another processor. Advantageously, by permitting individual program functions to be assigned to any processor, thus allowing a process to be spread over several processors, the size of local memory for each processor can be reduced. Repeated copies of a function used by many processes can be eliminated.

In one embodiment of this invention, external bus means interconnect processors and shared memory means. Further, input/output controllers have the same access to the bus means as processors, can call or be called for the execution of a program function using the same techniques, and can similarly access shared data. Advantageously, this provides full access among all input/output controllers, processors, and shared memory.

In one embodiment of this invention, the shared memories, processors, and bus means are adapted to transfer blocks of data rapidly and efficiently by treating the words of the block together instead of as separate and independent entities. Consecutive addresses need not be transmitted repetitively for such a block transfer. Advantageously, this reduces the number of address translations required and permits the system to operate efficiently even with a slower address translation mechanism. Advantageously, the bus means are used for transferring blocks of data among input/output controllers, shared memory means, and processors, thus providing highly flexible interconnection apparatus among these units.

In one embodiment of this invention, virtual addressing is used to access memory. The virtual address translation mechanism used in one specific embodiment is a single common facility accessible by all processors, and comprises one or several independent translation modules. These modules operate on different portions of the virtual address spectrum. Advantageously, the use of a common facility makes it economically feasible to make this facility large enough to eliminate those page faults which in prior systems result from required translations not being available in the translation mechanism. In one embodiment of this invention, each program process occupies a different portion of the virtual address spectrum. Advantageously, this facilitates a relatively uniform distribution of translation load among the translation modules. In one embodiment, data indicating the identity of a processor designated to execute a called program function and an indication of the address of that called program function is stored in memory. Advantageously, such memory can be shared memory. If virtual addressing is used in a system, such memory can be addressed using virtual addressing means. Alternatively, such data may be stored in the virtual address translation mechanism.

In an alternative embodiment of a virtual address translator, such a translator is implemented using a group of at least two serially connected blocks to perform the translation. Each block comprises memory, register and adder means. The input to the first block represents an initial virtual address, the output of each block is the input to the next block and the output of the last block includes the physical address corresponding to the initial virtual address. The blocks can be operated in a pipeline mode to allow action on several translations to proceed simultaneously. In a specific alternative embodiment, three blocks are used in tandem. The alternative embodiment of an address translator is used in an address translation module of which there may be one or a plurality of indepedent modules.

In one embodiment of this invention, processors are arranged to generate physical addresses after having generated a translation from a virtual to a physical address. The address translation means are adapted to transmit such physical addresses without translation. Physical addresses may, for example, occupy a dedicated portion of the total address spectrum. This arrangement reduces the number of translations required and permits the system to operate efficiently even with slower address translation mechanisms. Advantageously, the use of slower address translation mechanisms makes it economically possible to greatly expand the address capacity of these mechanisms, thus reducing page faults.

In one embodiment of this invention, the bus means are split into three segments operating simultaneously and independently. One segment transmits signals from processor output means to virtual address translation means. A second segment transmits signals from the output of virtual address translation means to shared memory addressing and data input means. A third segment transmits signals from shared memory output means to processor input means. intersegment connections are provided for cases in which the output of one bus segment can be transmitted directly to the next bus segment. In addition, each segment of the bus system can carry many simultaneous transactions. Each memory result and each data word to be written is tagged with the identification of the requesting or sending unit respectively so that several memory responses and several data words to be written can be interleaved. The bus means can also be used for transmitting data among processors and input/output units. Advantageously, a bus system in accordance with this invention provides high throughput without the prohibitive expense of prior art high performance buses.

BRIEF DESCRIPTION OF THE DRAWING

The invention will be better understood from the following detailed description when read with reference to the drawing in which.

DETAILED DESCRIPTION

Figure 1:
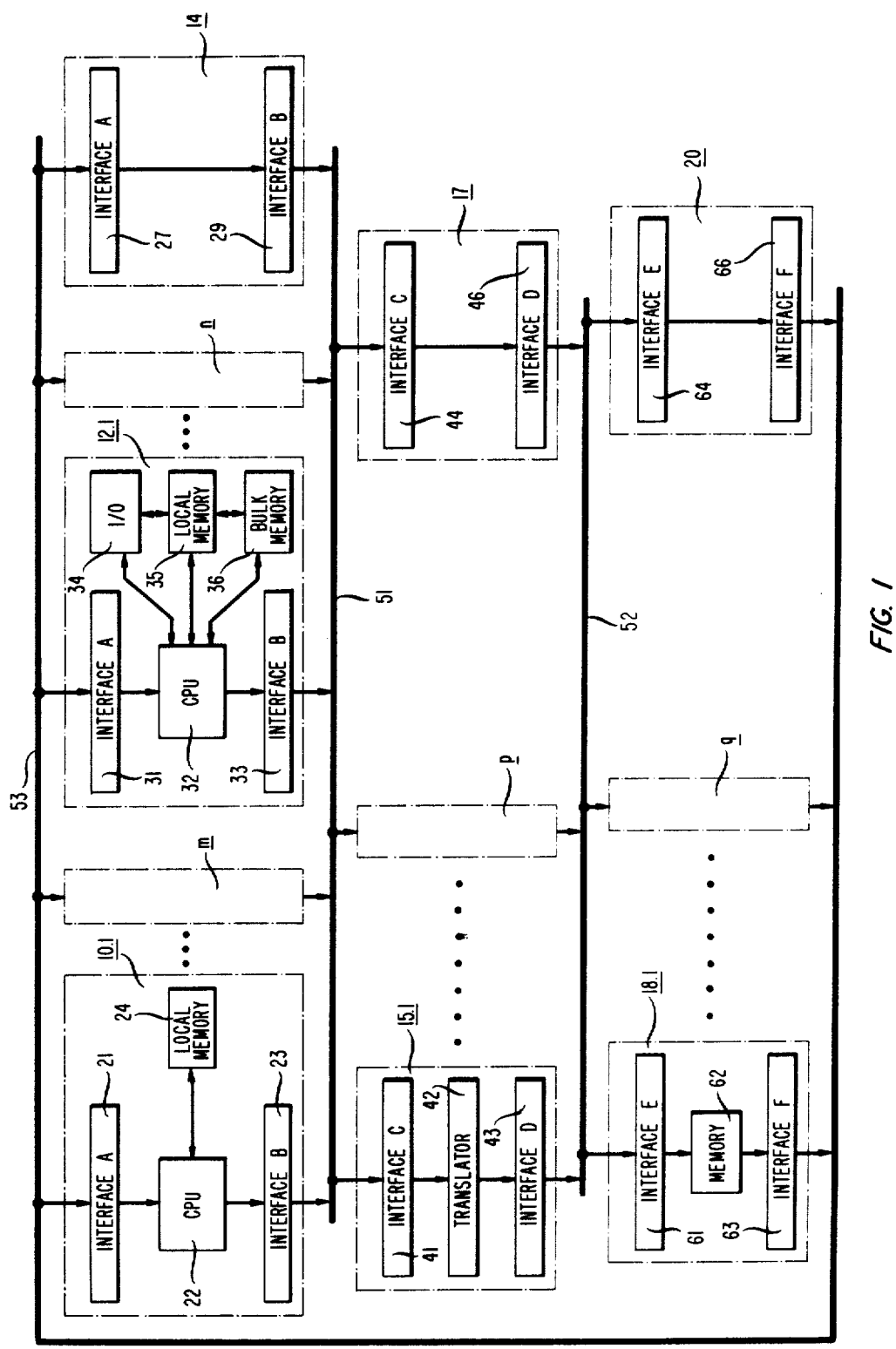
FIG. 1 is a block diagram of a multiprocessor system representing an illustrative embodiment of the invention.

FIG. 1 is a block diagram of an illustrative multiprocessing system consisting of processors 10.1, . . . , m, input/output (I/O) modules 12.1, . . . , n, address translators 15.1, . . . , p and shared memory modules 18.1, . . . , q, interconnected by bus system 51, 52, 53. The processors are identical in structure and each includes a central processing unit (CPU) 22, a local memory 24, and bus interface circuits 21 and 23. The CPU 22, which may be a commercially available unit such as the Motorola MC 68000, is connected to the local memory 24 which stores programs and data dedicated to the CPU. The interface circuits 21 and 23 provide an interface between the CPU and buses 51 and 53. The I/O modules 12.1, . . . , n are identical in structure and each comprises a central processing unit (CPU) 32, interface circuits 31 and 33 by which the CPU is connected to buses 51 and 53, and input/output equipment 34, local memory 35, and bulk memory 36 all connected to the CPU. The CPU 32 may be the same kind of machine as the CPU 22. Local memory 35 is adapted to store data and the programs for the CPU 32. The input/output equipment 34 includes input and output terminals. Bulk memory 36 consists of bulk storage devices such as magnetic disks and tapes.

Memory modules 18.1, . . . , q are identical in structure, each including a standard random access memory unit such as memory 62 and bus interface circuits 61 and 63. Any of the memory modules may be addressed by any of the processors or I/O modules. The memory addresses transmitted on bus 51 may be either virtual addresses or addresses of physical memory locations (physical addresses). A virtual address is the identification of an item (program or data) which may be stored at any physical address in one of the memory modules or in bulk memory in one of the I/O modules. Virtual addresses occurring on bus 51 are translated by means of the address translators 15.1, . . . , p into physical addresses defining physical location in the memory modules. Each of the address translators includes a translator unit 42 and interface circuits 41 and 43. The translator units are well-known virtual address translators which include information defining the present physical location of the item identified by the virtual address.

If the data contained in the translator 42 indicates that the physical address corresponding to the translated virtual address is in one of the memory modules 18.1, . . . , q, the translator module will transmit the physical address to the appropriate memory module via bus 52. In the event that the corresponding physical address does not fall within the range of addresses of the memory modules, the item identified by the virtual address is obtained from the bulk memory location corresponding to the virtual address and placed in a selected one of the memory modules. Furthermore, the information in the translators is changed to reflect the selected memory module location for the virtual address. The memory access operation may be completed using the new physical address. Address tables stored in memory define the present location of all data, whether in bulk storage or in a memory module.

In this embodiment of the invention, the bus system is broken into three parts. Bus 51 is used to transmit address and data outputs of the processors and I/O modules to the translators 15.1, . . . , p. Bus 52 is used to transmit addreses and data to the memory modules 18.1, . . . , q. Bus 53 is used to transmit data from the memory modules to processors 10.1, . . . , m and I/O modules 12.1, . . . , n. Also connected between buses 51 and 52 is a pass-through unit 17 consisting of interface circuits 44 and 46, to allow signals, such as physical address signals generated by a processor or I/O module to be passed directly from bus 51 to 52. A similar arrangement allows the direct passage of signals from bus 52 to bus 53 via bypass unit 20 and from bus 53 to bus 51 via bypass unit 14.

Each of the units connected between bus 51 and 52 have an input interface circuit C and an output interface circuit D. Similarly, each of the units connected between bus 52 and bus 53 have an input interface circuit E and an output interface circuit F, and units connected between buses 53 and 51 have an input interface circuit A and an output interface circuit B. In each instance, interface circuits identified with the same letter are identical and each of the circuits is designed to assure compatibility between the bus circuitry and the circuitry to which it is connected.

The address spectrum of the system is broken down into three parts. The total range is from 0 to $(2^{32}-1)$. The first part, 0 to $(2^{24}-1)$ is reserved for local addresses within each processor. The same addresses can be used by all the processors and input/output modules for addressing their own local memories. The second range, $2^{24}$ to $(2^{26}-1)$ is dedicated to physical addresses of shared memory. Each such physical address defines a unique location in the physical memory accessed by bus 52. The third range, $2^{26}$ to $(2^{31}-1)$ is used for virtual addresses of shared memory.

Each processor is adapted to recognize local addresses and retain these internally. Thus, local (first range) addresses are not transmitted on bus 51. The bypass module 17 is adapted to recognize addresses in the second range and to transmit such addresses directly to bus 52 without translation. Only third range addresses are translated by modules 15.1, . . . , p. Module 17 is also adapted to recognize and transmit data (as opposed to addresses) directly to bus 52.

In the illustrative multiprocessing system, different portions of the total virtual address spectrum are devoted to different processes. This helps to prevent unwanted inter-process interference, and makes it possible to protect memory, common to several processes but associated at one instant with only one process, from being illegally accessed by an unauthorized process. The translation mechanism generates memory protection codes for all memory accesses, and can generate a different memory protection code for the same location if it is associated with a different process.

The translation mechanism is broken up into different modules, each of which treats a different portion of the total address spectrum. This makes it unnecessary to store any address translation in more than one module. Each process has its own virtual address set, and each address translation module then operates upon a different set of processes. This arrangement is used to equalize the load on the different address translation modules.

The use of a single overall address translation mechanism which stores each translation only once makes it economically feasible, using conventional address translation methods, to store enough translations so that page faults due to missing translation data in the translation mechanism can be substantially eliminated. An alternative is to use a translation mechanism implemented through the use of random access memory and successive look-up operations based on the process number, segment and page; since this embodiment of the invention has sharply reduced the number of translations required, such an approach is feasible and offers an economical, very large translator module.

If a processor or input/output module must perform a number of memory operations in a particular block, it can access the basic address translation tables of the system, stored here in shared memory, to generate the physical address of that block. Thereafter, the processor or input/output module can execute programs using the physical address of that block. These physical addresses (second range) are then transmitted from bus 51 to 52 by module 17, without requiring address translation. This reduces the address translation load on the system. Alternatively, it is also possible to add a special read command to the system which would return to a requesting processor a physical address instead of the data stored at that address; such a facility would speed up the process of generating a physical address.

In a multiprocessor system, it is frequently necessary to transfer substantial amounts of data between bulk memories or from bulk memory to random access memory and vice versa. In this embodiment of the invention, this is accomplished by using buses 51, 52, and 53 to implement block transfers of data among input/output modules, the local memories of the processors, and the shared memories. The write transfer of a block of data is accomplished by sending to the appropriate memory an initial address, a block write command, and the length of a block of data, and thereafter transmitting only data. The length and initial address are stored in interface E (61) which subsequently controls the writing of the individual words of data until the block write has been accomplished. A block read is accomplished the same way except that a block read command is sent and the individual words of data are sent from the shared memory to the input/output or processor modules. Interface A (21, 31) is used to store the initial address and length of block for a block read, in order to control the action of writing into the local memory (24, 25).

In order to implement a block transfer from a processor or input/output module to another such unit, a special command to alert the destination unit of a block transfer is provided. This command includes the identification of the destination unit and is recognized by interface A (21, 31) of that unit. Interface A then interrupts the associated CPU (22, 32). The destination unit is now ready to receive the initial address and length of block for a block read or write and to accept the data words for a block write or to send out the data words associated with a block read.

Interface circuits A through F associated with the various modules of this system are adapted to transmit signals to and receive signals from the bus system. In some cases, they are further adapted to store extra signals and to control block operations. These interface circuits are made up of registers, counters, range recognition circuits, module identification recognition circuits, first-in, first-out register stacks, bus access arbiter circuits to resolve bus access conflicts, bus receivers, and bus transmitters, all well known in the art.

Interfaces A (21, 27, 31) and B (23, 29, 33) are adapted to implement the block transfer operations, and to recognize those signals on bus 53 which are destined for a particular processor. They include counters and addressing registers to allow the successive reads or writes associated with a block transfer to be read from or stored into the correct portion of local memory. In addition, interface B is adapted to resolve bus access conflicts between different processors.

Interface C (41) in address translation modules 15.1, . . . , p, is adapted to recognize addresses within the assigned range of the associated translator. Interface C has storage to accept a number of almost simultaneous requests for translations by the same translator module. Interface C (44) in module 17 is similarly adapted to recognize the range of addresses not requiring translation and to recognize data to be passed directly to bus 52. Interface D (43, 46) is adapted to resolve bus access conflicts to bus 52 between different address translator modules and the bypass module 17.

Interface E (61) is adapted to recognize data signals and addresses on bus 52 destined for a particular shared memory module, and is adapted to control block transfer operations. It may be desirable for some applications to further adapt interface E to accept isolated read or write requests in the middle of a block transfer operation. In addition, interface E is adapted to accept additional requests while memory 62 is reading a given location. Interface F(63) is adapted to resolve bus access conflicts to bus 53.

Since a number of shared memory read and write transactions, including some block transactions, are taking place simultaneously, interfaces B are adapted to tag address, block length, and data signals with the identification of the requesting processor module 10.1, . . . , m or input/output module 12.1, . . . , n, and interfaces F are adapted to tag data returned from a shared memory module 18.1, . . . , q with the identification of the requesting module. Interfaces A are adapted to check for this tag on any response from a read or block read command. Interfaces E are adapted to recognize the tag of a previously sent address that is attached to a subsequent block length or write data signal, and to be responsive to such tagged signals. In the case of a block transfer from a processor or input/output unit to another such unit interface A of the destination unit looks for the tag of the source unit. In addition, interfaces F are adapted to generate an acknowledgement including the identification tag of the requesting processor or I/O module on a write or block write command, and interfaces A are adapted to recognize such acknowledgements. Interfaces C and D are adapted to transmit the identity of the requesting processor or input/output module along with address, block length, or data sent to shared memories.

Figure 2:
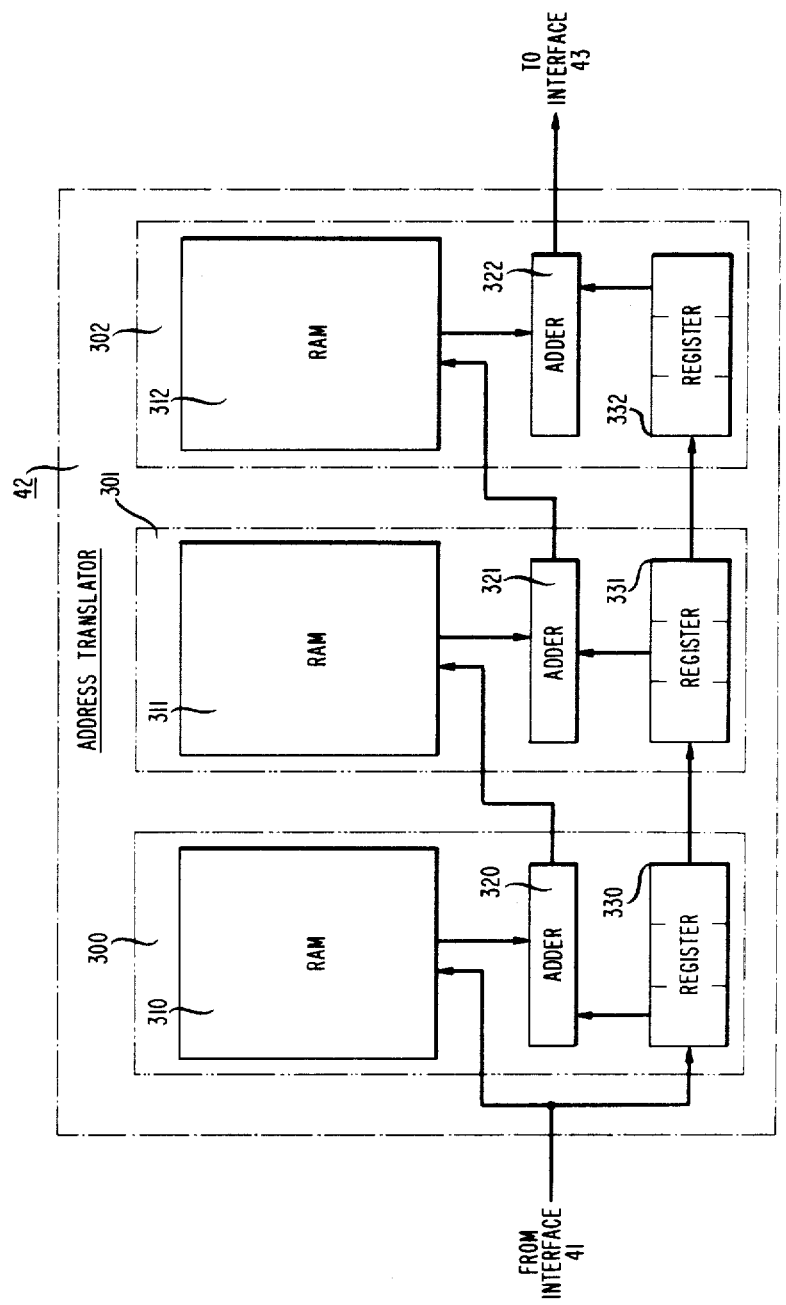
FIG. 2 is a memory layout of memory entries used in executing programs in the system of FIG. 1.

FIG. 2 shows an alternate implementation for the translators 42 of the address translation modules. Address translator 42 comprises three random access memories (RAM's) 310, 311, and 312 each with an associated adder (320, 321, 322, respectively) for combining input signals to produce the appropriate output and an associated register (330, 331, 332, respectively). A virtual address is composed of a process number, segment number, page number, and page offset. The process number is used to address RAM 310, while the segment number, page number and page offset are stored in register 330. The output of RAM 310 (segment address table location) is added to the segment number selected from register 330 and used as an address of RAM 311. The contents of RAM 311 (page address table location) are then added to the page number in register 331 to locate the data specifying the specific page address in RAM 312. The output of RAM 312 (page address) is added to the page offset to generate the physical address corresponding to the original virtual address. In effect, RAM 310 stores the locations of virtual address segment tables of each process in RAM 311; the increment of the segment number then locates the data in RAM 311 specifying the location of the page address table in RAM 312; the increment of the page number then locates the page address stored in RAM 312. Note that address translator 42 can work in a pipeline mode, in which each of the three RAM's is simultaneously reading data for the translation of a different virtual address. Note further that address translator 42 is composed of three essentially identical blocks 300, 301, 302 differing only in the portion of the register 330, 331, 332 connected to adder 320, 321, 322. In some systems, it is possible to use concatenation arrangements or other specialized adding arrangements for some or all of the adders 320, 321, 322. In more or less complex virtual addressing arrangements, it is possible to use only two blocks, or more than three blocks, for implementing the translator.

Figure 3:
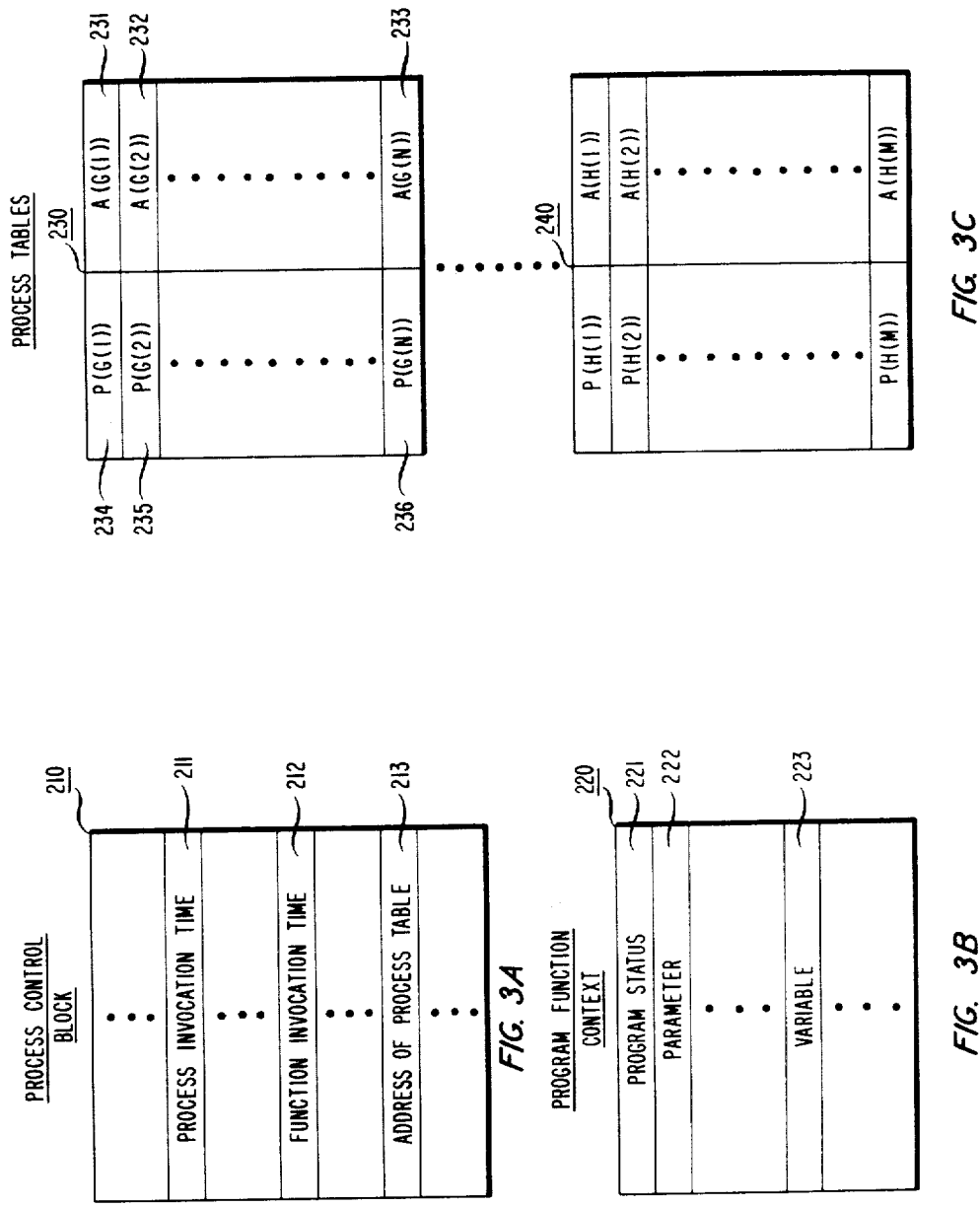
FIGS. 3a, 3b, 3c and 4 are a memory layout of work queues for the processors of the system of FIG. 1.
Figure 4:
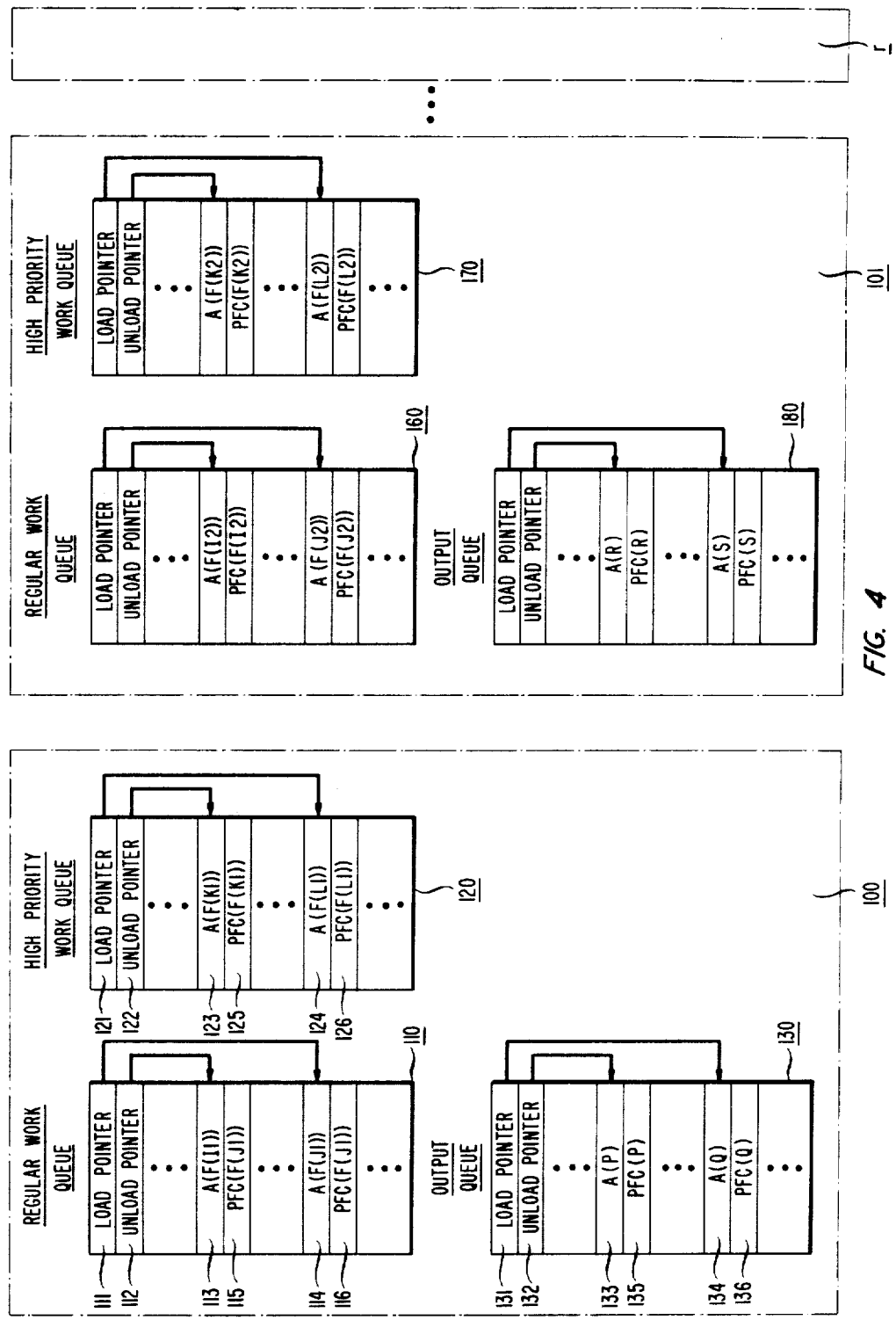

FIGS. 3 and 4 show memory layouts associated with the flow of program control in the multiprocessor system. The individual major tasks which a data processing system must carry out in order to accomplish its total objective are usually called program processes. These processes are carried out by executing a number of subtasks or program functions. In a multiprocessor system, several processes are normally being executed simultaneously on different processors, and using different portions of shared memory. In the multiprocessor system of this invention, the various program functions associated with a given program process need not be executed on one processor; instead, one processor can call for the execution by another processor of a program function within the same process.

Each process that is active in the system has a process control block (FIG. 3A) of memory dedicated to keeping track of status information and parameters needed by the process. The time that the process was originally invoked is stored in location 211 and the time that the most recent function being executed on this process was invoked is stored in location 212 in the typical process control block 210. FIG. 3B shows the layout of a program function context 220, which is maintained during a program process. The context is a last in, first out memory stack. The most recently generated parameters in locations 222 and variables in locations 223 can then be found by going a small number of levels into the stack. The program status indication of the program function execution is kept with the program function context in location 221.

FIG. 3C shows two process tables 230 and 240, one for each of two processes. Each table contains a list of processor identifications and addresses for all the functions used by a process. For example, as indicated in locations 234 and 231 respectively, the first function, G(1), used by the first process shown in designated to be executed on processor P(G(1)); the address inside that processor in which this first function is stored is A(G(1)). In similar fashion, as indicated in locations 235, ..., 236 the processors, P(G(2)), ..., P(G(N)) are designated to execute functions G(2), ..., G(N); as indicated in locations 232, ..., 233, these functions are stored at internal addresses A(G(2)), ..., A(G(N)), within these processors. Similarly, the processor identifications and addresses for the M functions H(1),H(2), ..., H(M), of a second process are shown in table 240 of FIG. 3C. Alternatively, it is possible to store indicators, such as an index or the address of a pointer, from which a processor executing a program can generate a program address and/or a processor identification.

Table 230 is initialized when the system first recognizes the need to execute the first program process and loads the various program functions required to execute that process in various processors. The table entries are filled in as each program function is loaded into its processor. When virtual memory addressing is used, as in the system being described, this table is stored at a virtual address, either defined within the code of the various program functions which may call any of the program functions of this program process, or found via pointers located at such a virtual address. In a similar manner, table 240 is initialized when the system recognizes the need to execute the second program process.

Alternatively, the contents of table 230, 240, and other similar tables can be used as the primary translation table mapping from virtual to physical addresses. This primary translation table could be stored in memory and inserted into the translation mechanism as needed, or, in case the translation mechanism were implemented through the use of random access memory and successive look-up operations, could be stored directly in the address translation mechanism.

FIG. 4 shows the memory layouts of work queues which are used to allow one program function being executed on one processor to call for a second program function to be executed either on the same processor or on any other processor in the system. Block 100 shows memory associated with a first processor, block 101 with a second processor, ..., block r with a last processor. In this discussion, input/output controllers are included among processors. In a system with i processors and j input/output modules, a total of i+j such blocks would be maintained.

Each processor has associated with it a work queue such as 110 containing a list of program functions which that processor has been called upon to execute and which it has not yet executed. In the described system, there is both a regular work queue (110, 160) and a high priority work queue (120, 170), in order to allow special high priority functions to be executed before regular functions. It is possible, using techniques well known in the art, to implement more complex priority schemes in which there can be more than two priorities of tasks. Moreover, methods of interrupting the current execution of a function in order to execute a special high priority task are also well-known in the art.

In this system, in order to simplify the problems which are associated with assuring that access to the work queue of one processor is not simultaneously sought by several other processors, each processor has an associated output queue (130, 140). The calling processor loads a request for the execution of a called function into its own output queue. A separate process, controlled, for example, by a third processor, is used to examine called program function requests in the output queues of each processor and load corresponding entries into the work queue of the processor designated to execute the called program function.

Each entry in a queue includes a program address or an address in a process table, such as 230, and the address of the program function contact. Each queue has a load and an unload pointer for example, 111, 112. The load pointer is controlled by the processor loading the queue, the unload pointer by the processor unloading the queue. Thus, the first processor controls load pointer 131 and writes entries such as 133 and 134 into its output queue as it executes program functions which call for the execution of other program functions. The first processor also controls unload pointer 112 and 122 of its work queue and reads entries such as 113, 114, 123, and 124 preparatory to executing the corresponding called functions which have been requested through the execution of corresponding calling functions.

The third processor, executing a separate process, executes a program function which examines the contents of output queues such as 130 and 180 and loads entries into the work queues such as 110, 120, 160 and 170. The third processor reads entries such as 133 in the output queue of each processor. After it reads one of these entries, it changes unload pointer 132. It examines the corresponding table entry in FIG. 3C to find the selected processor and program address and writes the program address into the appropriate work queue of the selected processor. The third processor then modifies the load pointer 111 or 121 of the appropriate work queue of the selected processor. In this arrangement, there is no restriction preventing the calling and called processor from being the same. The procedure for the call is identical.

Consider now a case in which the first processor is executing a first function and recognizes that there is a need to call for the execution of a second function. Both functions are in the first process in FIG. 3C and labeled G(1) and G(2). Processors P(G(1)) and P(G(2)) are the first and second processors in this example. During the course of execution of function G(1), the first processor will have entered data into a program function context including the status of the program and the parameters and variables that function G(2) will need in order to execute. In order to execute its part of the work of the function call, the first processor will load into its output queue 130 the address of entry 235 of table 230 of FIG. 3C. The first processor will then modify the load pointer 131 to point to this new entry.

The third processor will subsequently examine the load pointer 131 and unload pointer 132 of the output queue of the first processor and will recognize that the two do not match. This is an indication that the first processor has made an entry in its output queue. The third processor will examine the word pointed to by the entry in 133 of the output queue, where it will find the identity of the processor P(G(2)) (the second processor, in this case) which will execute function G(2), and the address A(G(2)) in that processor. The third processor will use the identity of the processor P(G(2)) to find the regular work queue 160 of the second processor and will enter the address of G(2), A(G(2)), in that work queue. In addition, it will copy into work queue 160 the pointer 135 to the program function context that the second processor will need in order to execute the second function. The third processor will then increment the load pointer of the regular work queue 160 of the second processor.

Subsequently, the second processor when it has finished other work will check to see if there is additional work by looking at the load pointer and unload pointer of its work queues 160 and 170. If these do not match, for either work queue, new work has been loaded into one of its work queues. The second processor will prepare to execute the next called function whose address and the address of whose program function context it will find in its work queue. It will then update the unload pointer so that after finishing the execution of this program function, it will be prepared to execute the next requested program function.

In the case of a function call in which the calling program function expects a return, the return from the called program function is implemented as a call to the original calling function. The return address data is stored in the program function context by the original calling program function and found there by the called program function; values derived by the called program function are stored in locations specified by the calling program function.

In this embodiment, program function context, output queues, work queues, and their associated pointers are all in shared memory. Since facilities, such as those used for block transfers, exist to allow the reading from and storage into local memory of other processors, it is possible to place some of these items in local storage. An alternate solution to the process of calling for the execution of a process, is for the calling processor to write directly into the work queue of the called processor. This by-passes then process carried out in the above example by the third processor. It is also possible to implement the work queue using a first-in, first-out register stack in interface A (e.g., 21, 31) between a central processing unit and bus 53. This would allow one processor to write a call request directly into memory associated with a called processor.

In this embodiment, the address of the program function context and to the called program function are both stored in the work queue of the called processor. An alternative solution is to store only the address of the program function context, and to store the address of the program function, or a pointer to such an address, in the program function context. Furthermore, in this embodiment, program function addresses are recorded directly in the work queue. An alternative solution is to record a pointer or other indicator of such an address.

It is to be understood that the above-described embodiment is merely illustrative of the principles of this invention; other arrangements may be devised by those skilled in the art without departing from the spirit and scope of the invention.

What is claimed is:

1. In a multiprocessing system having a plurality of processors each of the processors having an associated work queue, the method of executing a program process, having an associated program function context stored in memory accessible by each of said processors, by different processors, comprising the steps of:

initiating a process comprising a first and a second function in any of said plurality of processors;

storing an indication of the identity of a first processor and of the address of a first function at an address specified as part of a second function;

executing said second function by means of a predetermined one of said processors, including entering data into said program function context stored in memory accessible by each of said processors;

storing a link to said program function context and said indication of the address of said first function in the work queue associated with said first processor; and executing said first function by means of said first processor using said program function context containing said data entered into said program function context during execution of said second function, whereby a first program function executed by means of a first processor is linked to a second program function executed by any processor and uses a program function context containing data entered during execution of said second function.

2. In the system of claim 1 in which each of said plurality of processors comprises local memory, and in which said indication of the address is an indication of a local memory address in said first processor, said method further comprising the steps of:
storing said first program function in local memory of said first processor; and
storing said second program function in local memory of said predetermined one of said processors.

3. In the system of claim 2 in which said system comprises storage accessed by virtual addressing means wherein said step of storing an indication comprises the step of storing said indications at a virtual address specified by said second function.

4. In the system of claim 1 in which said system comprises storage accessed by virtual addressing means, wherein said step of storing an indication comprises the step of storing said indications at a virtual address specified by said second function.

5. The method of claims 1, 2, 3, or 4 in which said linking step further comprises the step of storing said indication of the address of said first function in said work queue associated with said first processor.

6. The method of claims 1, 2, 3 or 4 in which said linking step further comprises the step of storing said indication of the address of said first function in said program function context.

7. The method of claims 1, 2, 3, or 4 in which said step of linking comprises the step of storing the address of said program function context in said work queue associated with said first processor.

8. The method of claims 3 or 4 further comprising the step of initializing the system with the virtual addresses specified for the program functions executed by a given program process prior to executing said given program process.

9. The method of claim 8 in which said processors generate virtual and physical addresses occupying distinct virtual and physical address ranges further comprising the method of accessing said storage accessed by virtual addressing means comprising the steps of:
generating a specific address;
determining whether said specific address is within said physical address range or said virtual address range;
translating said specific address to a corresponding physical address and addressing said storage accessed by virtual addressing means if said specific address is within said virtual address range; and
addressing said storage accessed by virtual addressing means without translation if said specific address is within said physical address range.

10. The method of claims 3 or 4 in which said processors generate visual and physical addresses occupying distinct virtual and physical address ranges further comprising the method of accessing said storage accessed by virtual addressing means comprising the steps of:
generating a specific address;
determining whether said specific address is within said physical address range or said virtual address range;
translating said specific address to a corresponding physical address and addressing said storage accessed by virtual addressing means if said specific address is within said virtual address range; and
addressing said storage accessed by virtual addressing means without translation if said specific address is within said physical address range.

11. A multiprocessor system for executing a plurality of program processes each process having an associated program function context, comprising:
a plurality of processors;
storage means for storing an indication of the identity of a designated one of said plurality of processors and of a first program function and for storing said program function contexts;
bus means for accessing said storage means;
each of said plurality of processors comprising means for accessing said program function contexts in said storage means via said bus means and each operative under program control to initiate a process;
work queue means associated with each of said processors;
said processors operative under program control to store a link to a predetermined program function context and to said first program function in the work queue means associated with said designated processor;
wherein said designated processor is operative to execute said first program function using said predetermined program function context.

12. The system of claim 11 further comprising:
local memory means associated with each of said processors;
means for storing said first program function in local memory means associated with said designated processor; and
means for storing a second program function in local memory means associated with a predetermined one of said processors, said second program function specifying the address of said indication of the identity of said designated processor and said indication of the address of said first function.

13. The system of claim 12 in which said processors are operative to generate virtual addresses, in which said storage means is accessed by virtual addressing means, and in which said system further comprises address translation means to translate from virtual addresses to physical addresses.

14. The system of claim 13 in which said address translation means comprise a plurality of address translation modules each of which translates addresses in different virtual address ranges.

15. The system of claim 14 in which different processes occupy different virtual address ranges.

16. The system of claim 11 in which said processors are operative to generate virtual addresses, in which said storage means is accessed by virtual addressing means, and in which said system further comprises address translation means to translate from virtual addresses to physical addresses.

17. The system of claim 16 in which said address translation means comprise a plurality of address translation modules each of which translates addresses in different virtual address ranges.

18. The system of claims 13 or 16 in which at least one of said processors is an input/output controller and in which said bus means comprises first bus means connecting output signals of said processors to inputs of said translator means, second bus means connecting output signals of said address translator means to inputs of said storage means, and third bus means connecting output signals of said storage means to inputs of said processors.

19. The system of claim 18 further comprising means for selectively sending signals directly from said first to said second bus means.

20. The system of claim 19 further comprising means for selectively sending signals directly from said second bus means to said third bus means.

21. The system of claim 20 further comprising means for selectively sending signals directly from said third bus means to said first bus means.

22. The system of claim 19 in which said address translation means comprises a plurality of serially interconnected translator blocks, each of said translator blocks comprising memory, register, and adder means, interconnected so that memory data and register data of each block are added to generate memory addresses for the next block, for generating intermediate translator data and physical address data, said plurality of blocks comprising:
a first block responsive to said virtual addresses to generate first intermediate translator data, and a last block responsive to intermediate translator data from the preceding block to generate physical address data.

23. The system of claim 18 further comprising means for selectively sending signals directly from said second bus means to said third bus means.

24. The system of claim 18 further comprising means for selectively sending signals directly from said third bus means to said first bus means.

25. The system of claim 13, 14, 15, 16, or 17 in which said processors further operative to generate physical address signals and in which said address translation means further comprise means for recognizing and transmitting physical address signals without translation.

26. The system of claim 25 in which at least one of said processors is an input/output controller and in which said bus means comprises first bus means connecting output signals of said processors to inputs of said translator means, second bus means connecting output signals of said address translator means to inputs of said storage means, and third bus means connecting output signals of said shared memory means to inputs of said processors.

27. The system of claim 26 in which said means for accessing said program function contexts in said storage means are further operative to transmit to said bus means signals representing a first address and a processor identification, a first length of a block of data and said processor identification, and a first series of data words each with said processor identification, and signals representing a second address and said processor identification and a second length of a block of data and said processor identification, and to receive from said bus means signals representing a second series of data words, each with said processor identification, corresponding to said second address and length; and
in which said storage means comprise means for receiviing from said bus means signals representing said first address and said processor identification, said first length of a block of data and said processor identification, and said first series of data words each with said processor identification, and signals representing said second address and said processor identification, and said second length of a block of data and said processor identification, and is responsive to said second address and said second length of a block to transmit to said bus means signals representing a series of data words each with said processor identification, whereby the consecutive data words for a number of transactions from and to different processors can be interleaved on the bus and can be identified by said processor identification.

28. The system of claim 18 in which said means for accessing said program function contexts in said storage means are further operative to generate and transmit signals representing a processor identification with each address and read/write command word, and each write data word; in which said storage means further comprises means for storing said identifying signals transmitted with said address words and to store data corresponding to write data words transmitted with identifying signals matching said stored identifying signals, and responsive to read commands to transmit said stored identifying signals with data read in response to said read command; and in which said means for accessing said program function context in said storage means are further operative to recognize said data read in response to said read command by recognizing said identifying signal; whereby the consecutive data words for a number of transactions from and to different processors can be interleaved on the bus and are identified by said identifying signal.

29. The system of claim 28 in which said address translation means comprises a plurality of serially interconnected translator blocks, each of said translator blocks comprising memory, register, and adder means, interconnected so that memory data and register data of each block are added to generate addresses for the next block, for generating intermediate translator data and physical address data, said plurality of blocks comprising:
a first block responsive to said virtual addresses to generate first intermediate translator data, and a last block responsive to intermediate translator data from the preceding block to generate physical address data.

30. A multiprocessing system for executing a plurality of program processes, comprising:
a plurality of processors, each of said processors comprising local memory means;
storage means for storing data words;
bus means interconnecting said processors and said storage means;
said processors comprising means for transmitting to said bus means words representing a first address and a processor identification, a first length of a block of data and said processor identification, and words representing each of a first series of data words each with said processor identification, and words representing a second address and said processor identification and a second length of a block of data and said processor identification, and for receiving from said bus means words representing each of a second series of data words, each with said processor identification, corresponding to said second address and length;
said storage means comprising means for receiving from said bus means words representing said first address and said processor identification, said first length of a block of data and said processor identification, and words representing each of said first series of data words each with said processor identification, and words representing said second address and said processor identification, and said second length of a block of data and said processor identification, and are responsive to words representing said second address and said second length of a block to transmit on said bus means words representing each of a series of data words each with said processor identification, whereby the consecutive data words for a number of transactions from and to different processors can be interleaved on the bus and can be identified by said processor identification.

31. The system of claim 30 in which said means for receiving of said processors are further operative to receive from said bus means words representing said first address and said processor identification, said first length of a block of data and said processor identification, and words representing each of said first series of data words each with said processor identification, and words representing said second address and said processor identification, and said second length of a block of data and said processor identification, and responsive to a word said second address and said second length of a block of data to transmit on said bus means words representing each of the series of data words each with said processor identification.

32. The system of claim 30 or 31 in which at least one of said processors is an input/output controller and further comprising:
 a work queue associated with each of said processors;
 in which said storage means are further operative to store a program function context for each active process of said program processes, and table data associated with a first program function specifying an indication of the identity of another processor designated to execute said first program function and an indication of the address of said program function;
 each of said processors further having an associated work queue means and further operative to enter context data in said storage means;
 said system operative under program control to store a link to a predetermined program function context and said indication of the address of said first program function in the work queue means associated with said designated processor;
 wherein said designated processor executes said first program function linked to the work queue means associated with said designated processor and further specified by said predetermined program function context.

33. The system of claim 32 in which said table data specifies an indication of the local address of said first program function, and further comprising:
 local memory means for storing a second program function in one of said processors, said second program function specifying the address of said table data; and
 local memory means for storing said first program function in said designated processor.

34. The system of claim 33 in which said processors are operative to generate virtual addresses, in which said table data is accessed by virtual addressing means, and in which said system further comprises address translation means to translate from virtual addresses to physical addresses.

35. The system of claim 32 in which said processors are operative to generate virtual addresses, in which said table data is accessed by virtual addressing means, and in which said system further comprises address translation means to translate from virtual addresses to physical addresses.

36. The system of claim 30 or 31 in which said processors are operative to generate virtual addresses, in which said storage means is adapted to respond to physical addresses, and in which said system further comprises address translation means to translate from virtual addresses to physical addresses, comprising: a plurality of serially interconnected translator blocks, each of said translator blocks comprising memory, register, and adder means, and adapted to generate translator data, said plurality of blocks comprising:
 a first block responsive to said virtual addresses to generate first intermediate translator data, and a last block responsive to intermediate data from the preceding block to generate physical addresses.

37. The system of claims 11, 12, 13, 14, 15, 16, 17, 30, or 31 in which at least one of said processors is an input/output controller.

38. A data processing system comprising:
 processor means for generating virtual address signals and first physical address signals said virtual and physical addresses occupying different address ranges;
 a memory module; and
 address translation means for recognizing said virtual address signals and responsive to said virtual address signals to generate and transmit corresponding second physical address signals to said memory module and for recognizing first physical address signals and transmitting said first physical address signals without translation to said memory module;
 wherein said address translation means comprises a plurality of serially interconnected translator blocks for generating translator data, each of said translator blocks comprising memory means and register means, and adder means for adding the contents of said memory means and said register means to generate memory addresses for the next block, said plurality of blocks comprising:
 a first block responsive to said virtual addresses to generate first intermediate translator data, and a last block responsive to intermediate translator data from the preceding block to generate physical addresses.

39. The invention of claim 35 in which virtual addresses and physical addresses occupy different address ranges.

40. The system of claim 13 or 16, in which said address translation means comprises a plurality of serially interconnected translator blocks for generating translator data, each of said translator blocks comprising memory means and register means, and adder means for adding the contents of said memory means and said register means to generate memory addresses for the next block, said plurality of blocks comprising:
 a first block responsive to said virtual addresses to generate first intermediate translator data, and a last block responsive to intermediate translator data from the preceding block to generate physical addresses.

41. In a multiprocessing system having a plurality of processors for executing a plurality of program processes, said system comprising shared memory means, bus means connected to each of said processors and each of said shared memory means, a method of transferring a block of data between any of said processors and any of said shared memory means comprising the steps of:

transmitting a starting address, a read/write transfer command and an identification of one of said processors from said one of said processors to one of said shared memory means;

transmitting data specifying a length of a block of data and said identification from said one of said processors to said one of said shared memory means;

transmitting a block of data corresponding to said length from said one of said processors to said one of said shared memory means and transmitting said identification with each word of said block in case a write transfer command has been sent; and transmitting a block of data corresponding to said length from said one of said shared memory means to said one of said processors and transmitting said identification with each word of said block in case a read transfer command has been sent.

42. In a multiprocessing system having a plurality of processors each of the processors having an associated work queue, comprising storage accessed by virtual addressing and a translation table specifying virtual to physical address mapping, the method of executing a program process having an associated program function context, stored in memory accessible by each of said processors, by different processors, comprising the steps of:

initiating a process comprising a first and a second function in any of said plurality of processors;

storing an indication of the physical identity of a first processor and an indication of the address of a first function in said translation table;

executing said second function by means of a second processor said executing step including the step of entering data into said associated program function context stored in memory accessible by each of said processors;

storing a link to said associated program function context and said indication of the address of said first function in the work queue associated with said first processor; and executing said first function by means of said first processor using said program function context containing said data entered into said program function context during execution of said second function, whereby said first program function executed by means of said first processor is linked to said second program function executed by said second processor and uses said program function context containing data entered during execution of said second function.

43. A multiprocessor system for executing a plurality of program processes each process having an associated program function context stored in memory, comprising:

bus means;

storage means accessed by virtual address signals via said bus means for storing said program function contexts;

a plurality of processors connected to said external bus means for accessing data in any of said program function contexts;

work queue means associated with each of said processors;

address translation mens to translate from virtual addresses to physical addresses;

said address translation means operative to store table data specifying the identity of a processor designated to execute a first program function and specifying an indication of the address of said first program function;

said system operative under program control to store a link to a predetermined program function context and said indication of the address of said first program function in the work queue means associated with said designated processor; and said designated processor further operative to execute said first program function linked to the queue means associated with said designated processor and further specified by said predetermined program function context.

44. In a multiprocessor system using virtual addressing, an address translator connectable to a source of virtual address signals for translating from initial input signals comprising a virtual address signal to a final output signal comprising a physical address signal, comprising:

a first block, responsive to said initial input signals and comprising a first input register responsive to a preselected portion of said initial input signals and adapted to generate a first register output signal and a first portion signal corresponding to the contents of a first predetermined portion of said first input register, a first random access memory responsive to a second preselected portion of said initial input signals to generate a first memory output signal, and a first adder means responsive to said first portion signal and said first memory output signal to generate a first sum signal;

a second block comprising a second input register responsive to said first register output signal and adapted to generate a second register output signal and a second portion signal corresponding to the contents of a second predetermined portion of said second input register, a second random access memory responsive to said first sum signal to generate a second memory output signal, and a second adder means responsive to said second portion signal and said second memory output signal to generate a second sum signal;

a third block comprising a third input register responsive to said second register output signal and adapted to generate a third portion signal corresponding to the contents of a third predetermined portion of said third input register, a third random access memory responsive to said second sum signal to generate a third memory output signal, and a third adder means responsive to said third portion signal and said third memory output signal to generate said final output signal comprising the physical address signal corresponding to said virtual address signal;

in which said first, second and third blocks are operative to work on translations of different virtual address signals at any one time; whereby translation actions are pipelined.

* * * * *

UNITED STATES PATENT AND TRADEMARK OFFICE
CERTIFICATE OF CORRECTION

PATENT NO. : 4,539,637
DATED : September 7, 1985
INVENTOR(S) : Dennis L. DeBruler It is certified that error appears in the above-identified patent and that said Letters Patent is hereby corrected as shown below:

```
Column 13, Claim 10, line 57, change "visual" to --virtual--.
Column 15, Claim 27, line 61, change "receiviing" to
--receiving--.
Column 17, Claim 31, line 25, change "the" to --a--.
Column 20, Claim 43, line 3, change "mens" to --means--.
```

Signed and Sealed this

Eleventh Day of February 1986

[SEAL]

Attest:

DONALD J. QUIGG

*Attesting Officer*     *Commissioner of Patents and Trademarks*